Feb. 15, 1944.  C. G. TRIMBACH  2,342,022
AIRCRAFT BOMB CARRIER
Filed Jan. 27, 1940   6 Sheets-Sheet 1

INVENTOR
CLEM G. TRIMBACH.
BY
ATTORNEY

Feb. 15, 1944. C. G. TRIMBACH 2,342,022
AIRCRAFT BOMB CARRIER
Filed Jan. 27, 1940 6 Sheets-Sheet 2
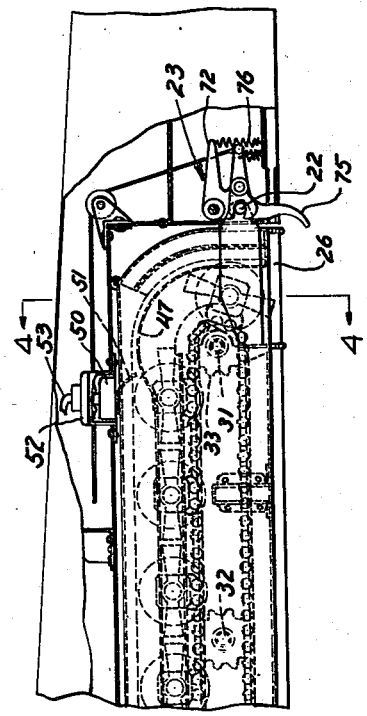
FIG. 3.
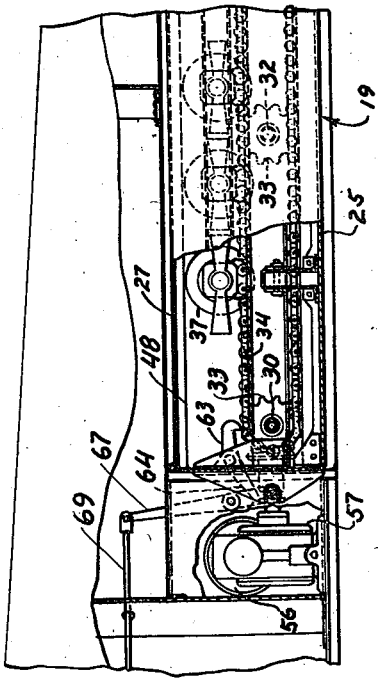
FIG. 4.
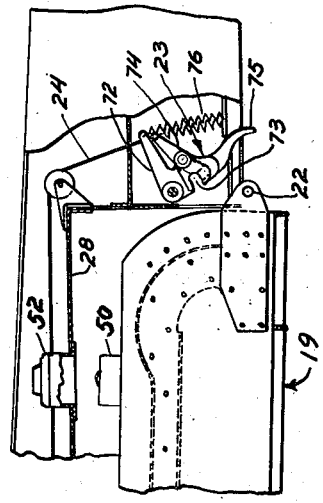
FIG. 5.
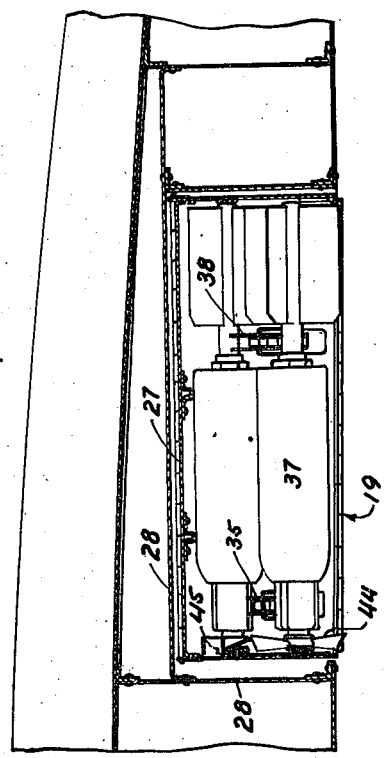
INVENTOR
CLEM G. TRIMBACH.
BY
ATTORNEY Feb. 15, 1944.   C. G. TRIMBACH   2,342,022
AIRCRAFT BOMB CARRIER
Filed Jan. 27, 1940   6 Sheets-Sheet 3
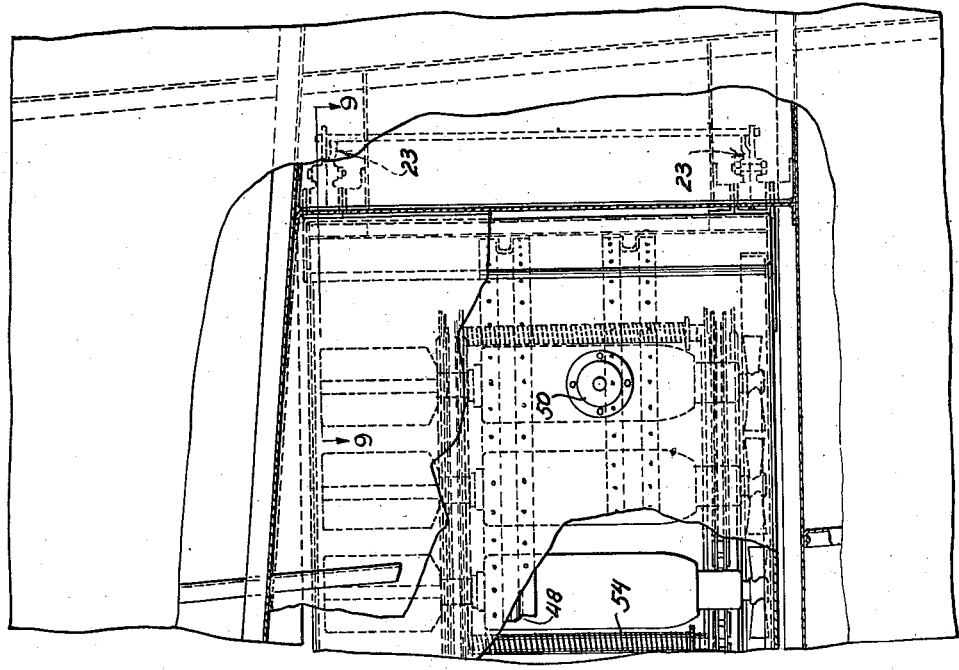
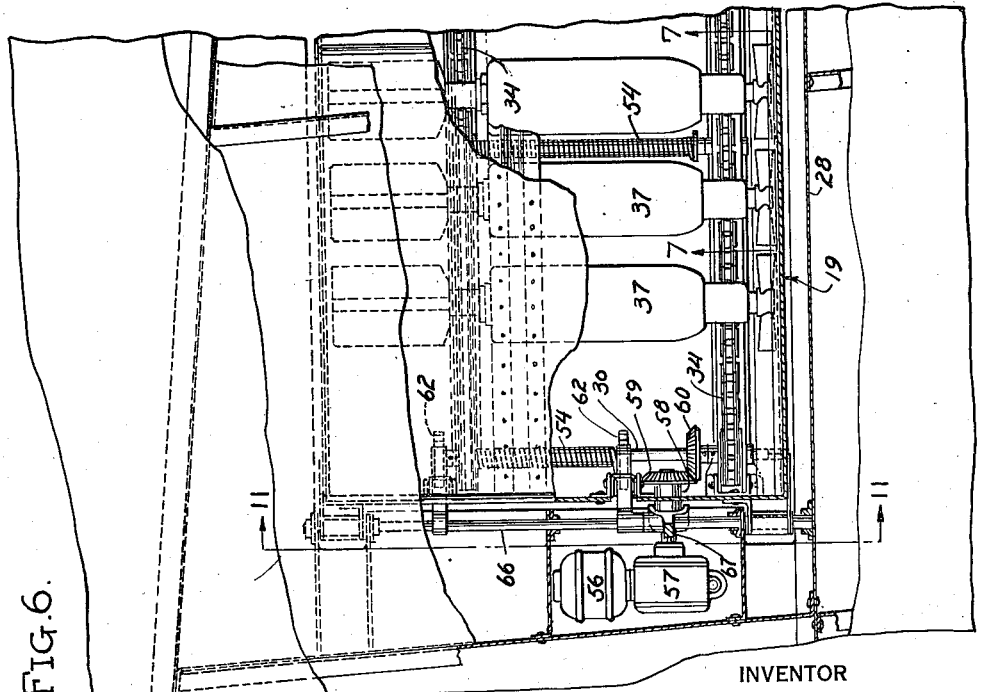
FIG. 6.
INVENTOR
CLEM G. TRIMBACH.
BY
ATTORNEY

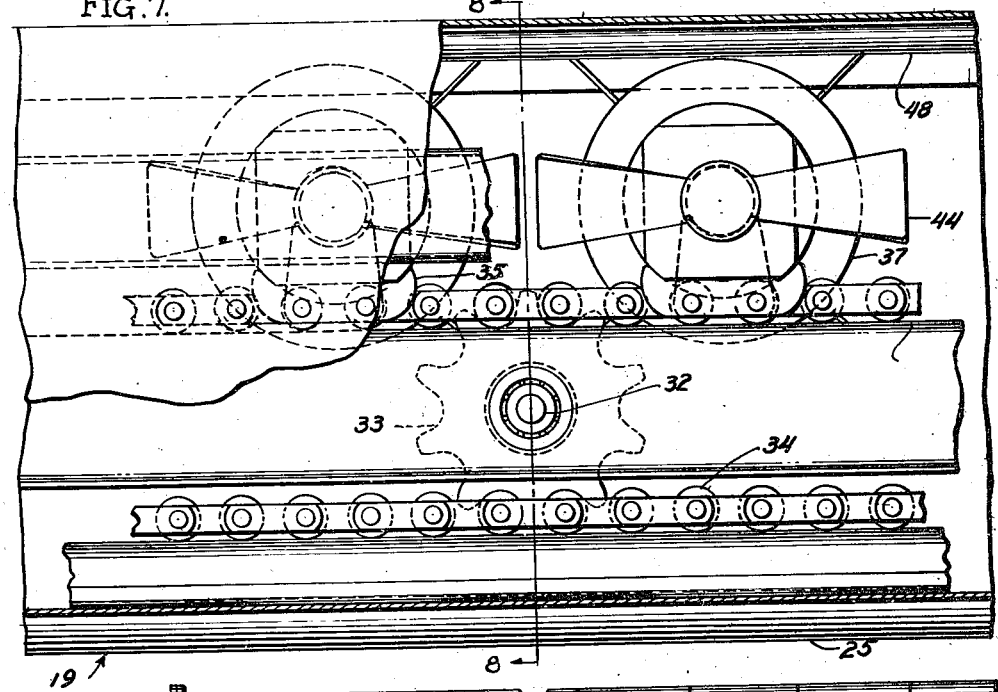
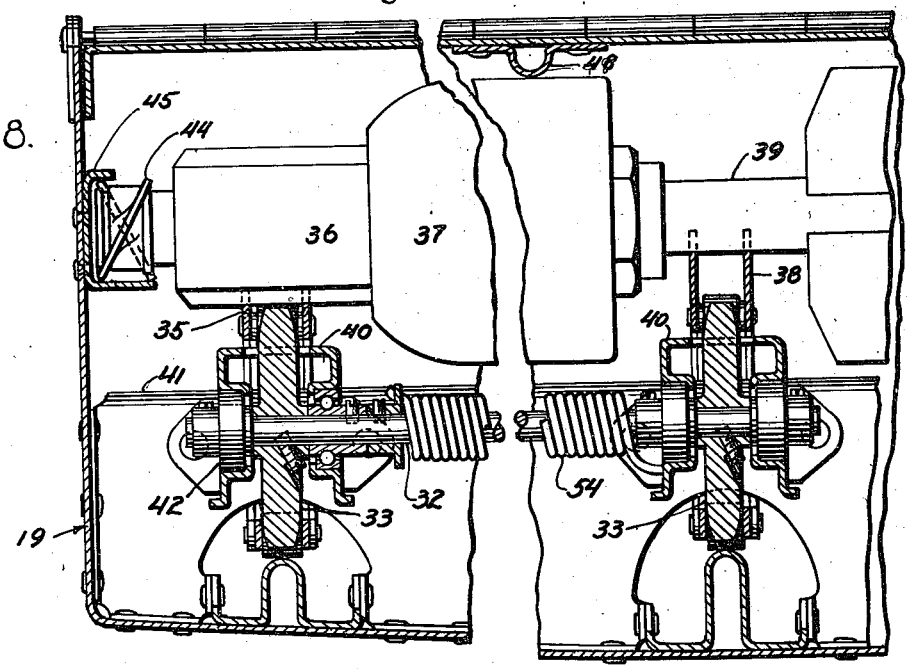

Feb. 15, 1944.  C. G. TRIMBACH  2,342,022
AIRCRAFT BOMB CARRIER
Filed Jan. 27, 1940  6 Sheets-Sheet 5

INVENTOR
CLEM G. TRIMBACH.
BY
ATTORNEY

Feb. 15, 1944.  C. G. TRIMBACH  2,342,022
AIRCRAFT BOMB CARRIER
Filed Jan. 27, 1940  6 Sheets-Sheet 6
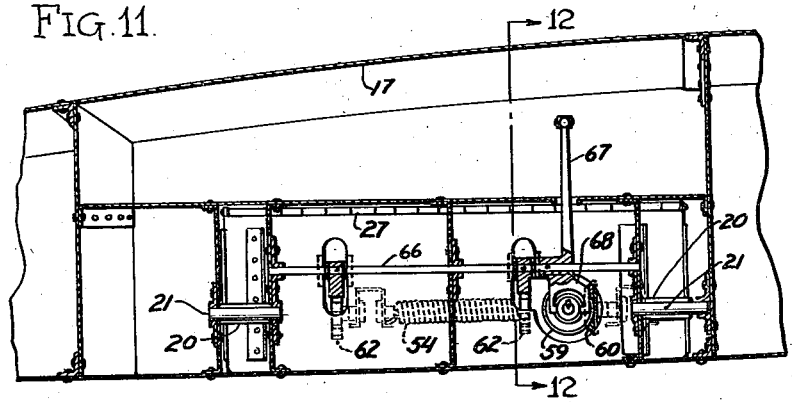
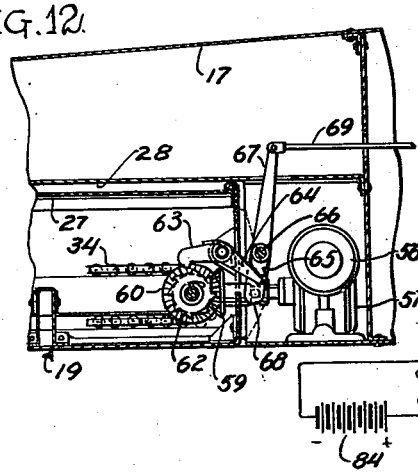
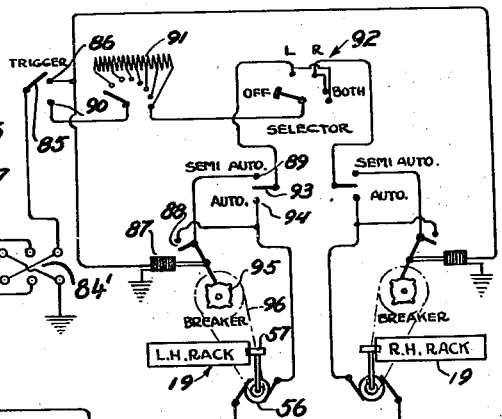
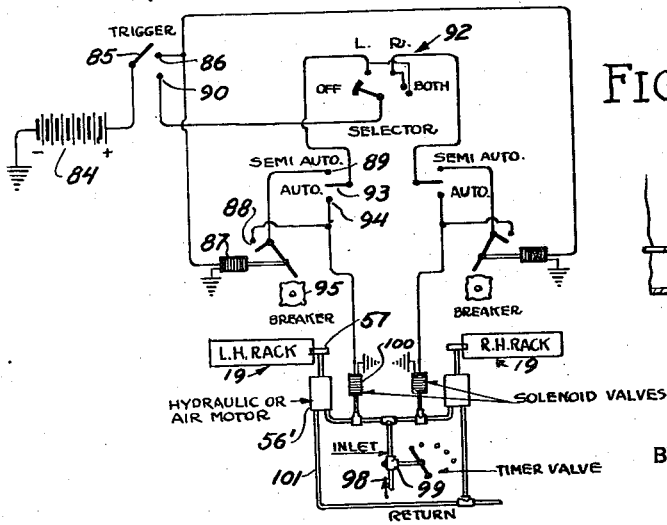
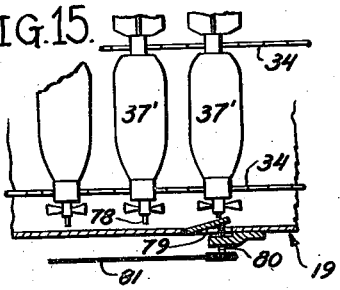
INVENTOR
CLEM G. TRIMBACH.
BY
ATTORNEY Patented Feb. 15, 1944

2,342,022

UNITED STATES PATENT OFFICE 2,342,022

AIRCRAFT BOMB CARRIER

Clem G. Trimbach, Eggertsville, N. Y., assignor to Curtiss-Wright Corporation, a corporation of Delaware Application January 27, 1940, Serial No. 315,919

6 Claims. (Cl. 89—1.5)

This invention relates to aircraft armament and is concerned particularly with an improved bomb rack organization along with control means therefor.

The objects of the invention may be generally outlined as follows:

(a) To provide a demountable carrier or rack for a large plurality of bombs, the rack in part forming a portion of the outer skin surface of the aircraft to which it is secured.

(b) To provide a bomb rack unit which may be installed, loaded with bombs, in an aircraft, and which may be removed from aircraft for filling after the bombs have been discharged therefrom.

(c) To provide means by which the bomb rack may be dropped from or removed from the aircraft as a unit, either in the loaded or unloaded condition; an associated object is to provide means by which a loaded bomb rack may be dropped from the airplane, with the bombs safe, in case such maneuver should be necessary for the safe landing of the aircraft itself.

(d) To provide a bomb rack embodying a power driven conveyor which may be selectively operated to drop the bombs sequentially.

(e) To provide controls for the bomb conveying or moving system of such a nature that bombs may be sequentially dropped so long as the trigger mechanism is displaced, after the manner of a machine gun, and to provide means by which bombs may be dropped one at a time, the mechanism for the latter purpose involving controls which function somewhat after the manner of an auto-loading firearm.

(f) To provide a selectively operable power means for discharging bombs from a rack and to provide an auxiliary power source whose power diminishes as the load in the bomb rack diminishes, whereby the speed of bomb discharge may be maintained substantially constant.

(g) To provide means to indicate the bomb load still available for discharge.

(h) To provide means for automatically setting time fuses on fuse-equipped bombs. In connection with this latter objective, the prior art shows bombs having contact fuses—that is, bombs which detonate upon contact with their target. The present development indicates the use of bombs with time fuses which may be dropped from an aircraft to explode while still in the air, such bombs being used against enemy aircraft. Conventional practice in this respect has been to set the time fuses upon loading of the rack for an average time setting, but it would be preferable to be able to vary the time setting according to the distance between the bomb carrying craft and the enemy craft. Accordingly, the invention includes provision for remotely controlling time fuse setting on bombs substantially coincidentally with the discharge thereof from the bomb rack.

(i) To provide a prime mover for the bomb rack conveyor which is built into the aircraft and which is engageable with suitable drive mechanism on the removable bomb carrier when the carrier is installed in the aircraft.

(j) To provide means by which the speed of discharge of the bombs may be altered.

(k) To provide means by which arming devices on the bombs are retained in a safe position up until the instant of discharge of a bomb from the rack.

(l) To provide an electrical control system for the bomb rack of the invention and to provide alternate electric or hydraulic means for actuating the bomb rack.

The specific mechanisms by which the above outlined objectives are attained will be apparent in reading the annexed detailed description in connection with the drawings, in which:

Fig. 3 is a front elevation of a wing, broken away to show certain details of the mounting and construction;

Fig. 4 is a section on the line 4—4 of Fig. 3;

Fig. 5 shows a portion of the structure of Fig. 3 specifically indicating the means by which the bomb rack may be detached from aircraft;

Fig. 6 is a plan, partly broken away and in section, showing constructional details of the bomb rack and its mounting;

Fig. 7 is an enlarged section on the line 7—7 of Fig. 6;

Fig. 8 is a section on the line 8—8 of Fig. 7;

Fig. 11 is a section on the line 11—11 of Fig. 6;

Fig. 12 is a section on the line 12—12 of Fig. 11;

Fig. 13 is a wiring diagram for a bomb rack electrically controlled and energized;

Fig. 14 is a wiring diagram for a bomb rack electrically controlled and hydraulically energized; and Fig. 15 is a diagrammatic sectional plan of a portion of the bomb rack showing a controllable fuse setting mechanism.

Figure 1:
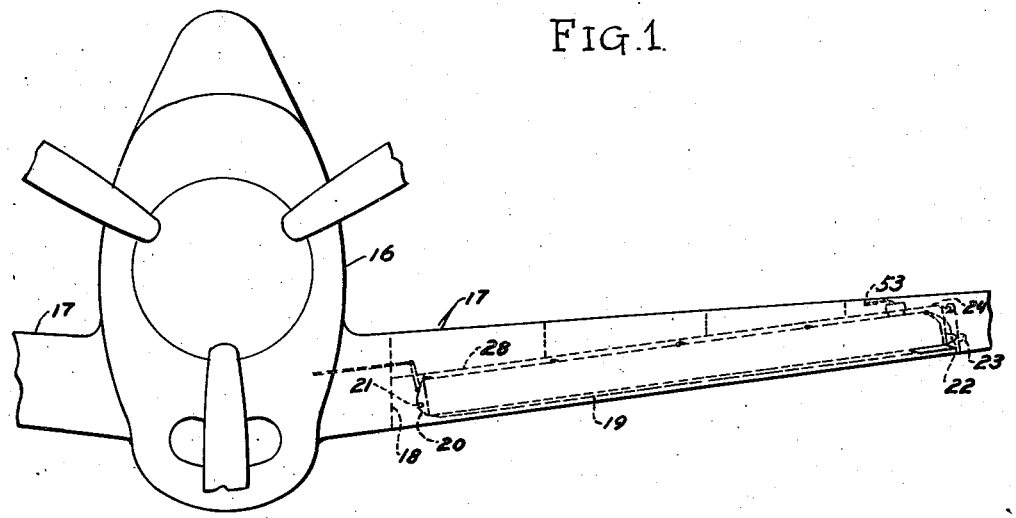
Fig. 1 is a fragmentary front elevation of an aircraft equipped with the bomb rack.
Figure 2:
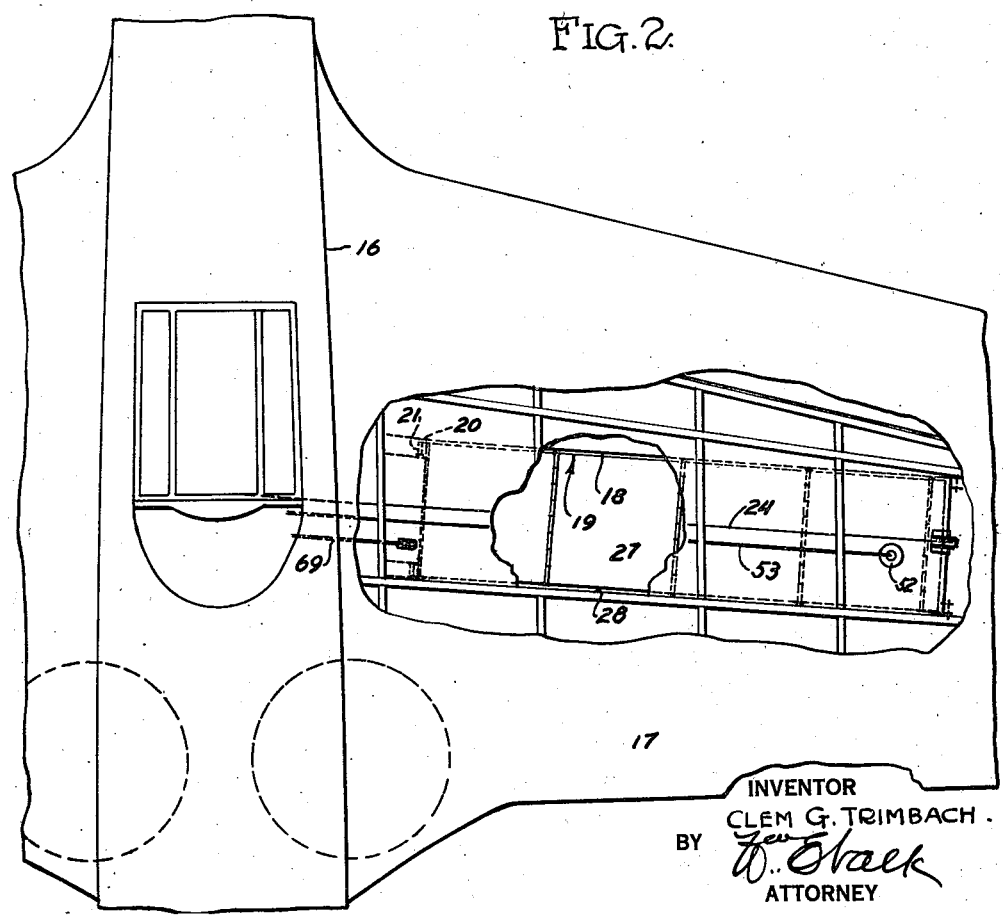
Fig. 2 is a fragmentary plan of the aircraft, partly broken away, to show the location of the rack.
Figure 9:
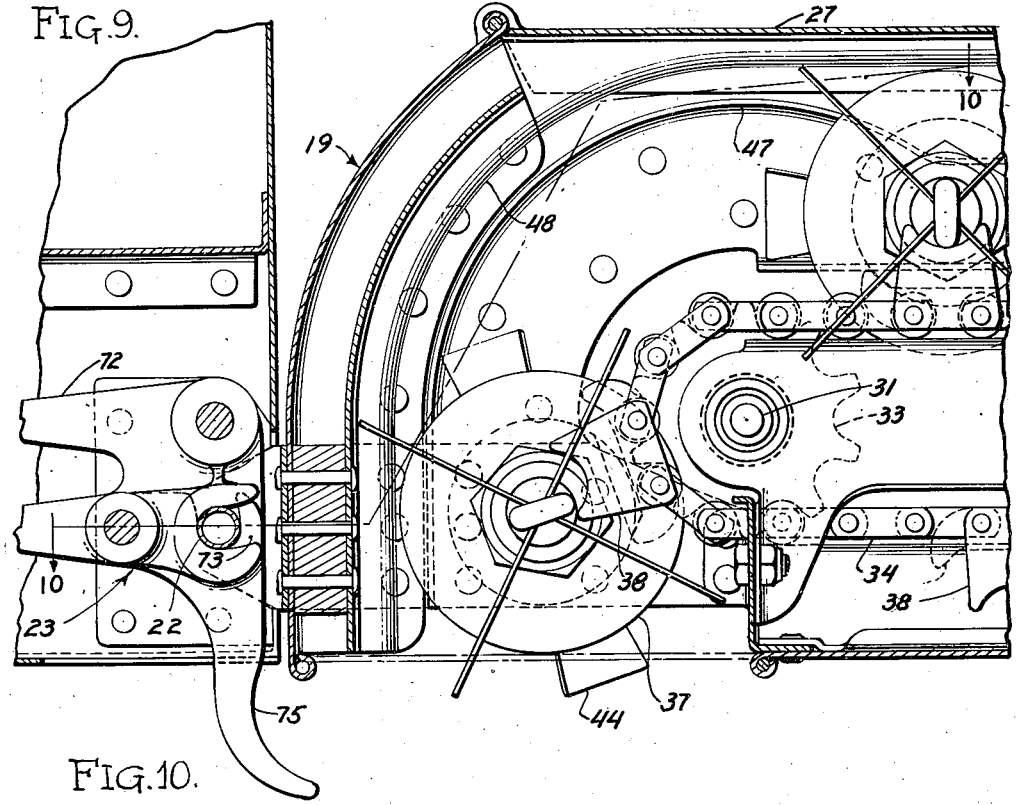
Fig. 9 is an enlarged section on the line 9—9 of Fig. 6.
Figure 10:
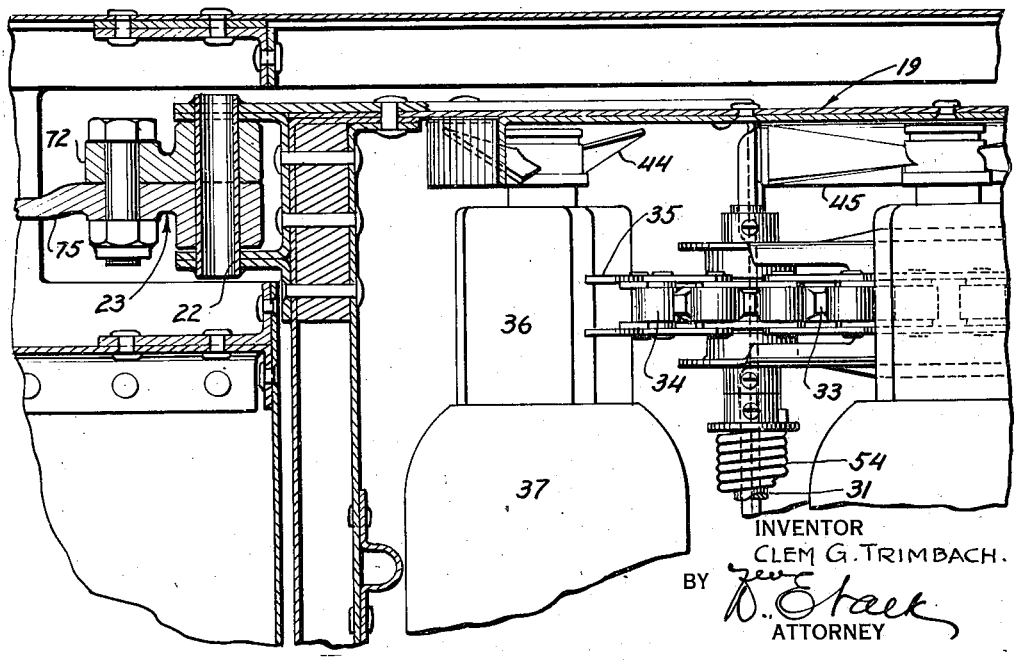
Fig. 10 is a section on the line 10—10 on Fig. 9.

In Figs. 1 and 2, 16 is an aircraft fuselage having cantilever monoplane wings 17 extending laterally therefrom, both wings including recesses 18 in their lower surfaces within which bomb rack units 19 may be secured, the racks 19 and their operation being similar except for being right and left handed. The inner end of the rack 19 carries notched plates 20 engageable with pins 21 secured to the aircraft, while the outer ends of the racks are provided with cross pins 22 engaged by latches 23 which may be manually operated from the ground or which may be operated by a cable 24 extending to the pilot's or bomber's quarters in the airplane.

As shown in subsequent figures, the bottom surface 25 of the rack 19 comprises a smooth flat metal sheet which, when the rack is installed in the aircraft, forms a part of the lower wing surface, except that the outer end of the cover 25 is open as at 26 to provide a discharge opening for bombs. The upper cover 27 of the rack 19 may be made as removable hinged sections so that when the rack is removed from the aircraft, the cover 27 may be removed for re-loading the bomb rack.

The recess within which the rack 19 is disposed is located between the normal front and rear spars of the wing and the recess also is lined with sheet material as at 28 so as to provide a relatively clean wing pocket if it should be necessary to fly the aircraft after a bomb rack has been removed or dropped.

In considering the bomb rack construction, reference may be made to various of the figures, Figs. 3, 4, and 6 being exemplary, wherein it will be noted that shafts 30 and 31 extend across the rack towards the ends thereof, and a number of parallel idler shafts 32 are disposed therebetween, each shaft carrying sprockets 33 at its ends over which spaced endless chains 34 are run. The forward chain, as shown in Figs. 7 and 8, carries spaced brackets 35 upon which the nose portions 36 of bombs 37 may rest. The rear chain carries brackets 38 upon which the tail portions 39 of bombs may rest. Thus, according to the length of the runs of the chains 34 a large plurality of bombs 37 may be accommodated on the conveyor. In addition to being supported by the idler sprockets 33, the chains pass along supporting rails 40 secured to rib elements 41 which likewise form the brackets in which are secured bearings 42 for carrying the sprocket shafts 31 and 32. As shown at the righthand end of Fig. 3, the sprocket 31 is disposed short of the end of the rack 19 so that as the conveyor is traversed toward the right, conveyor supported bombs are sequentially discharged from the end of the conveyor to pass through the discharge opening 26 in the rack.

Each bomb is provided with an arming propeller 44 at its nose which, when the bomb drops clear of the airplane, is spun by the relative airflow to arm the bomb fuse. To prevent any possible arming of the bombs while racked, a channel track 45 is secured to the front wall of the rack 19 and the propellers of the several bombs, when the latter are loaded, are located in this track. At its righthand end, the track 45 is swept outwardly in an arcuate path, as shown at 47 in Fig. 3, to allow the propellers to be held from rotation while the bomb passes over the end sprocket 31. The top cover 27 of the bomb rack is provided with track elements 48 which will normally be in small clearance relation with the tops of the racked bombs to permit of their free translation but to prevent dislocation of bombs from the conveyor should the aircraft be subjected to violent maneuvers.

Toward the righthand end of the bomb rack indicator element 50 is disposed which carries a finger 51 contactable with the bombs as they pass same. This finger operates an electrical switch and cooperates with a receptacle 52 affixed to the aircraft and connected by a cable 53 with a suitable indicator visible to the aircraft crew. Thus, the number of bombs still available for dropping may at all times be known.

The shafts 30 and 31 and the several shafts 32 which support the conveyor chains are embraced by helical springs 54, one end thereof being secured to the carrier and the other end thereof being secured to the shaft. When the conveyor is moved to the loading position, these springs are wound up and provide an auxiliary force tending to urge the conveyor toward bomb discharging movement. When the conveyor is fully loaded, a substantial force is required to move same while, as the conveyor is moved to discharge bombs, the bomb load gradually diminishes so that less power is required for conveyor operation. Thus, these springs 54, as they unwind with conveyor operation, provide a diminishing conveyor moving force more or less proportional to the remaining bomb load which, in cooperation with the prime mover 56, shortly to be described in detail, allows of a substantially constant rate of operation of the conveyor regardless of the number of bombs remaining thereon.

Fig. 6, along with others, shows the prime mover which comprises either an electric motor 56 or a hydraulic motor 56', driving a speed reducer 57, both of which elements are mounted in the aircraft wing. The power take-off of the speed reducer 57 comprises one element of a separable dog clutch or spline connection, cooperating with the other element of a dog clutch or spline connection contained in the hub 58 of a bevel gear 59 journaled in the carrier 19. This gear 59 meshes with the bevel gear 60 secured to the shaft 30. Actuation of the motor 56 accordingly operates the bomb carrying conveyor to cause discharge of bombs from the rack. In addition, the shaft 30 carries a ratchet wheel 62, best seen in Figs. 3 and 12, this wheel being engageable by a pawl 63 pivoted to the carrier. The pawl carries a finger 64 cooperating with a cam 65 mounted upon a shaft 66 which carries a lever 67 which controls through a yoke 68 the axial position of the bevel gear 59. The lever 67 is operated by a rod 69 extending into the crew quarters and its function is as follows: When a bomb rack has been emptied, the aircraft crew or the armorer on the ground may actuate the prime mover 56 by means of a reversing switch which will translate the conveyor backwards so that all of the bomb carrier brackets 35 and 38 are disposed on the top run of the conveyor and so that the springs 54 are wound up. Thereupon, the lever 67 is moved to engage the pawl 63 with the ratchet wheel 62 to hold the conveyor in the position referred to. Likewise, the bevel gear 59 is withdrawn from engagement with the bevel gear 60. Thereupon the rack 19 may be removed from the aircraft the top cover 27 of the rack removed, and a new set of bombs loaded upon the brackets 35 and 38 Then, the rack is reinstalled in the aircraft, th driving connection between the speed reducer 57 and the gear 59 being re-established. The lever 67 may be held in that position which permits pawl engagement with the ratchet wheel 62 until such time as it is desired to drop bombs. Then, movement of the lever 67 engages the bevel gears 59 and 60 and disengages the pawl 63 from the bevel gear 60. Then, upon actuation of the motor 56 bombs may be discharged.

An alternate mode of operation is to coincidentally actuate the lever 67 and the motor 56 so that when the motor is dead, the pawl 63 engages the wheel 62, but so soon as the motor is energized, the pawl is disengaged to permit conveyor movement.

Figs. 3 and 5 show the deails of the rack securing mechanism 23, such mechanism consisting of the bell crank member 72 pivoted to the aircraft structure and provided with a hook opening 73 engageable with the pin 22 on the carrier 19. Upon installation of the rack, the member 72 is rotated clockwise, as shown, so that the pin 22 of the carrier is engaged by the member. Added security against inadvertent disengagement is provided by a latch 74 pivoted to the member 72 and hooking over the pin 22, this element having a finger lever 75 projecting below the aircraft wing surface for manipulation by an armorer. The element 74 may also be operated by the cable 24 which is secured to it, this cable serving as an emergency release by which the whole carrier may be dropped from the aircraft in flight in case of necessity. Springs 76 serve to urge the rack latching mechanism 23 toward the locking position.

In Fig. 15 I show an additional mechanism which may be incorporated in the bomb carrier system to allow of automatic time fuse setting. The bombs 37' are shown with a rod 78 projecting from the fuse nose which rod is axially movable to set the timing mechanism for bomb detonation at any desired time interval after the bomb has been armed by discharge from the carrier. As the bombs move on the conveyor chains 34, they pass an adjusatble ramp 79 pivoted to the front wall of the carrier 19, this ramp being adjustable as to position by means of a screw 80 operated by a remote cable control 81. By proper adjustment of the screw, the end of the ramp may be set for any desired bomb timing for, as the bombs pass the ramp, the pins 78 are pressed inwardly thereby to establish time fuse setting. The time fuse setter shown is merely exemplary and is not to be construed as limiting with respect to the idea of securing variable time fuse settings in aircraft bombing practice.

Figs. 13 and 14 show diagrammatically means for operating the bomb carrier either automatically or semi-automatically, both involving electrical control means but one embodying an electric prime mover for the carrier and the other embodying a hydraulic prime mover therefor. The electric power source shown as a battery 84 has its opposed poles connected to ground and to a trigger switch 85 respectively through a suitable reversing switch 84' as illustrated. The trigger switch 85 when depressed, first engaging the point 86 to energize a solenoid 87 whose plunger closes a switch 88 serially connected with the motor 56 (in the case of Fig. 13) and with a switch point 89. When the switch arm passes the point 86, it engages a point 90 connected through an adjustable rheostat 91 with a selector switch 92 which may be adjusted, as is obvious, for control of the lefthand, the righthand, or both bomb racks in the airplane. The switch 92 is branched to control similar circuits for the right and left hand racks, each branch passing to a switch arm 93 which may be set to contact with the point 89 or the point 94, the latter being directly connected to the motor 56. Now, if the switch 93 be engaged with contact 94, automatic operation of the bomb carrier obtains—that is, so long as the trigger switch 88 is closed, the motor 56 will be energized, thereby sequentially discharging a plurality of bombs from the rack. If the switch arm 93 be engaged with the contact 89, the motor 56 will be energized to discharge but one bomb, since the motor drives the breaker wheel 95 through a transmission 96 to effect opening of the switch 88 so soon as a single bomb has been discharged, regardless of the length of time during which the trigger switch 85 is closed with the switch point 90. Upon release of the trigger switch 85, the contact 86 is engaged by the trigger arm to again close the switch 88 until the motor 56 is again operated to discharge a bomb. The rheostat 91 serves to adjust the speed of operation of the motor 56, thereby controlling the rate of discharge of bombs when the system is set for automatic operation. The reversing switch 84' is provided so that when the bomb rack has been emptied, the motor 56 may be operated in the reverse direction to wind up the springs 54 and to reposition the brackets 35 and 36 preparatory to removing the bomb rack container as previously described.

The system of Fig. 14 has certain control elements common with those of Fig. 13 and they, accordingly, bear the same reference characters. The essential difference is that the electric motor 56 is replaced by a hydraulic or pneumatic motor 56' fed from a conduit 98 from a suitable fluid pressure source. The conduit 98 is provided with an adjustable throttle valve 99 to control the rate of fluid flow and consequently the speed of operation of the hydraulic or pneumatic motor. Starting and stopping of the motor 56' is controlled by a solenoid operated shut-off valve 100, the solenoid thereof being controlled by the electric control system as previously described, the solenoid valves 100, so far as the electric control system is concerned, replacing the electric motor 56. Discharge fluid from the motor 56' passes through a return line 101 back to the fluid pressure source. The mode and sequence of operation of the hydraulic system are identical with those of the electrical system.

From the above detailed description it will be apparent that I have provided a bomb carrier and control system therefor which accomplishes the objectives set forth at the beginning of this specification, the apparatus providing in effect bomb dropping equipment whose operation is analogous to a machine gun selectively operable for automatic or autoloading operation. It is likewise apparent that the removable bomb carrier is quickly exchangeable on the aircraft so that the substitution of a loaded carrier for an unloaded carrier may be promptly effected and the empty carrier may be reloaded at leisure. Likewise, the bomb carrying system herein disclosed allows of very accurate bomb discharge and the mechanisms involved in the system are particularly designed to avoid undue weight and complication.

I claim as my invention:

1. In aircraft comprising a wing having a recess in its lower surface, a unitary bomb container lying in the recess, releasable means normally securing the container to the wing, a conveyor within the container carrying a plurality of bombs, a motor in the aircraft, and a drive connection from the motor to the conveyor separated by removal of the container from the wing, said container having an opening for sequential discharge of bombs as the motor is operated, and auxiliary force producing means for moving the conveyor proportional substantially in the force produced to the number of bombs remaining on the conveyor.

2. In an aircraft bomb rack, an endless chain conveyor having spaced support brackets upon which bombs are adapted to be placed, said conveyor having a discharge chute at one end through which bombs are sequentially discharged as the conveyor chain is moved, motor means for moving said conveyor to discharge bombs therefrom, and auxiliary spring means urging the conveyor toward movement with a force in accordance with the position thereof.

3. In an aircraft bomb rack, an endless chain conveyor having spaced support brackets upon which bombs are adapted to be placed, said conveyor having a discharge chute at one end through which bombs are sequentially discharged as the conveyor chain is moved, motor means for moving said conveyor to discharge bombs therefrom, auxiliary spring means urging the conveyor toward movement with a force in accordance with the position thereof, and mechanism to reverse said motor to return the conveyor system to its initial position and to reset said spring means.

4. In a bomb carrier for aircraft comprising a chain conveyor upon which bombs are stored for subsequent discharge upon conveyor actuation, a pair of parallel endless chains, end and idler sprockets supporting the chains and mounted on shafts, a housing structure embracing the conveyor and supporting said sprocket shafts, and helical springs embracing said shafts secured at their one ends to the shafts and at their other ends to the housing structure, and a reversible motor drivably connected to and selectively operable to drive the conveyor in either direction to wind up said springs, or to allow of unwinding thereof.

5. In a bomb carrier for aircraft comprising a chain conveyor upon which bombs are stored for subsequent discharge upon conveyor actuation, a pair of parallel endless chains, end and idler sprockets supporting the chains and mounted on shafts, a housing structure embracing the conveyor and supporting said sprocket shafts, and helical springs embracing said shafts secured at their one ends to the shafts and at their other ends to the housing structure, and a reversibly motor drivably connected to and selectively operable to drive the conveyor in either direction to wind up said springs, or to allow of unwinding thereof, said motor means being separable from the conveyor, and means to secure the springs against unwinding when the motor means and conveyor are separated.

6. In an aircraft having a recess in its underside, a container for a plurality of bombs detachably disposed within said recess with the bottom surface of said container comprising a bottom wall conforming to the outer surface of the aircraft adjacent said recess, said bottom wall having a bomb discharge opening, power means within said aircraft, means within said container connected to said power means and operable upon energization of said power means to discharge said bombs through said opening in said container, said connection including a separable coupling engageable by insertion of said container within said recess and disengageable as said container is removed from said recess, and quickly releasable means operable either from the inside or the outside of said aircraft for releasing the container as a unit therefrom.

CLEM G. TRIMBACH.